(12) United States Patent
Kim et al.

(10) Patent No.: US 11,184,782 B2
(45) Date of Patent: Nov. 23, 2021

(54) AUTOMATED PARAMETER DEPLOYMENT FOR CELLULAR COMMUNICATION NETWORKS

(71) Applicant: AT&T Intellectual Property I, L.P., Atlanta, GA (US)

(72) Inventors: Dongho Kim, Livermore, CA (US); Dhruv Gupta, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/701,928

(22) Filed: Dec. 3, 2019

(65) Prior Publication Data

US 2021/0168625 A1 Jun. 3, 2021

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC ..... H04W 24/02; H04W 24/04; H04W 24/08; H04W 84/18; H04W 16/00; H04W 16/18; H04W 88/10
See application file for complete search history.

(56) References Cited

U.S. PATENT DOCUMENTS

2016/0249353 A1* 8/2016 Nakata .................... H04L 45/50
2019/0313288 A1* 10/2019 Li ........................ H04W 28/0284
2019/0364616 A1* 11/2019 Mishra .................. H04W 88/16

OTHER PUBLICATIONS

Nayak et al., "Control and Management of Multiple RATs in Wireless Networks: an SDN Approach", 2018, 12 pages (Year: 2018).*

* cited by examiner

*Primary Examiner* — Quoc Thai N Vu
(74) *Attorney, Agent, or Firm* — Amin, Turocy & Watson, LLP

(57) ABSTRACT

The described technology is generally directed towards generating and deploying radio access network parameters by a management platform. The management platform can use a defined data structure as a carrier for parameters within the management platform. Newly generated parameters can be placed in the defined data structure. The newly generated parameters can be approved at the management platform for deployment to radio access network devices. A software defined networking function of the management platform can convert a parameter into a specific format utilized at a radio access network, and the software defined networking function can deploy the converted parameter to the radio access network.

20 Claims, 10 Drawing Sheets

AUTOMATED PARAMETER DEPLOYMENT FOR CELLULAR COMMUNICATION NETWORKS

TECHNICAL FIELD

The subject application is related to wireless communications systems in general, and to fifth generation (5G) and subsequent generation cellular communications systems in particular.

BACKGROUND

Network automation platforms, for example, the open network automation platform (ONAP) developed by the LINUX FOUNDATION®, provide tools to automatically configure, provision, manage and test network devices. Communication service providers, for example, AT&T® Corporation and others, employ network automation platforms within their respective core networks to interact with and manage radio access network (RAN) devices provided by multiple different vendors.

In order to manage network devices, a network automation platform can collect and analyze network device data, for example, data from various RAN devices. The network automation platform can develop new parameters, e.g., to optimize operations of the RAN devices, and the parameters can be deployed, e.g., to RAN element management systems (EMS), which can then deploy the parameters to RAN devices. The parameters can provide useful interface elements which can be adjusted as needed to accommodate different network circumstances and network use cases.

Deploying new parameters to RAN devices, however, presents technical challenges which have so far required varying degrees of human involvement. Meanwhile, the complexity of networks and the number of different use cases for network devices is projected to expand with the advent of Fifth Generation (5G) and subsequent generation networks. Therefore, there is a need in the industry to further automate deployment of parameters from network automation platforms to EMS and RAN devices.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
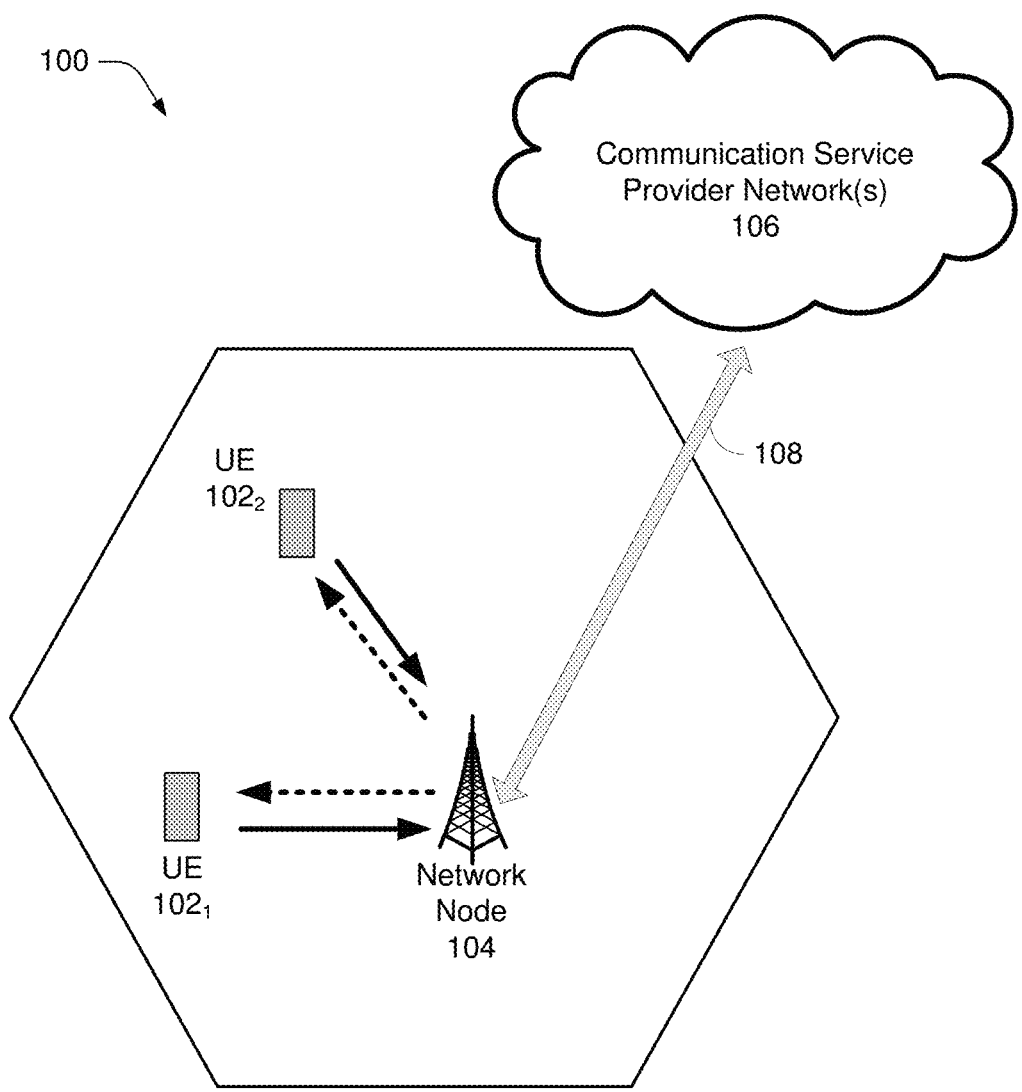
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards generation and deployment, by a management platform, of RAN parameters to RAN devices. Example embodiments can utilize a defined data structure, defined within a management platform as a carrier for parameters. Newly generated parameters can be placed in the defined data structure. The newly generated parameters can be approved at the management platform for deployment to RAN devices. In order to deploy a parameter to RAN devices, a SDN function of the management platform can convert the parameter into a specific format utilized at a RAN EMS, and the SDN function can send the converted parameter to the RAN EMS, e.g., via an applicable application programming interface (API).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
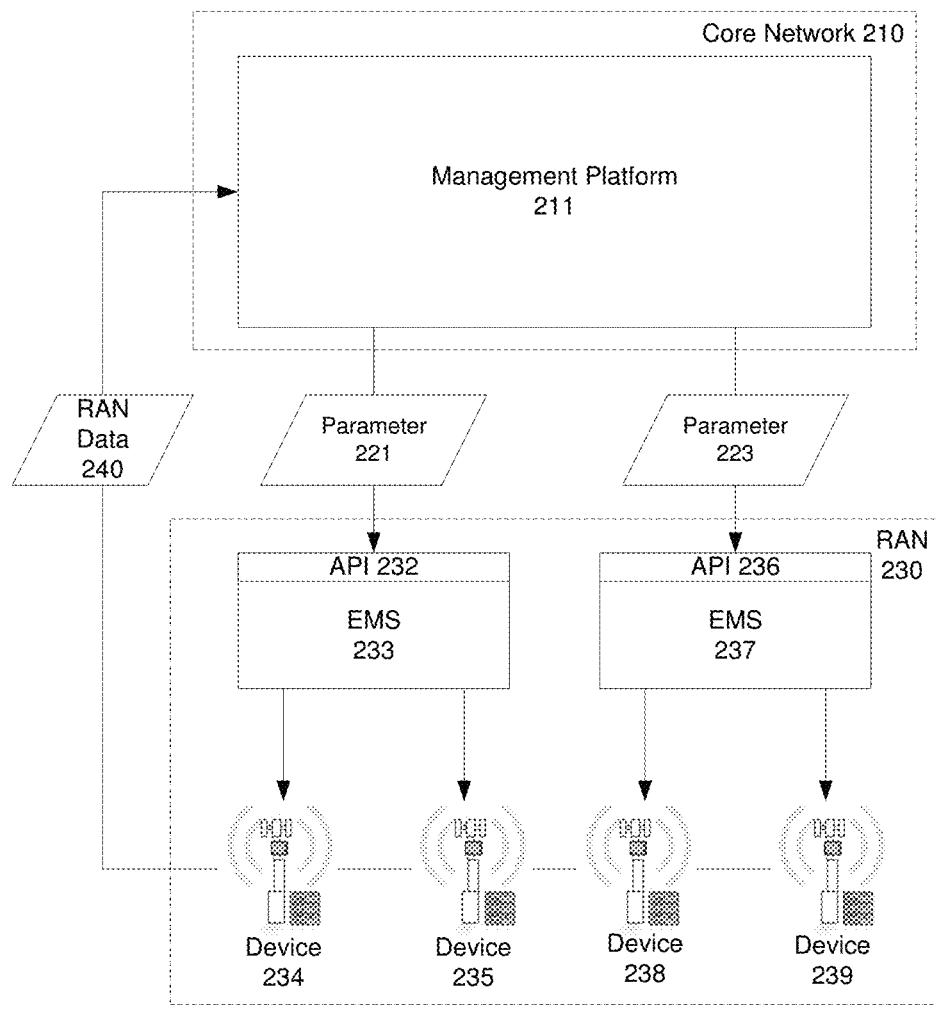
FIG. 2 illustrates an example architecture comprising a core network equipped with a management platform, wherein the management platform deploys parameters to radio access network (RAN) devices via RAN element management systems (EMS), in accordance with various aspects and embodiments of the subject disclosure.

FIG. 2 illustrates an example architecture comprising a core network equipped with a management platform, wherein the management platform deploys parameters to radio access network (RAN) devices via RAN element management systems (EMS), in accordance with various aspects and embodiments of the subject disclosure. FIG. 2 includes a core network 210 and a RAN 230. A management platform 211 is illustrated inside core network 210. RAN 230 comprises two example EMS 233, 237, each EMS having its respective API 232, 236. RAN 230 further comprises RAN devices 234, 235, 238, and 239, wherein EMS 233 manages devices 234 and 235, and EMS 237 manages devices 238 and 239. RAN devices 234, 235, 238, and 239 can comprise, e.g., devices at RAN base stations, devices at network nodes such as 104 in FIG. 1, as well as other network devices. In some embodiments, management platform 211 can comprise, manage and/or interact with a NAP, such as an ONAP type NAP, which can optionally be modified to serve as a NAP for a particular communication service provider.

In FIG. 2, management platform 211 deploys parameter 221 to EMS 233 via API 232. EMS 233 can then deploy parameter 221 to devices managed by EMS 233, such as device 234 and device 235. Similarly, management platform 211 deploys parameter 223 to EMS 237 via API 236. EMS 237 can then deploy parameter 223 to devices managed by EMS 237, such as device 238 and device 239.

Management platform 211 can furthermore deploy settings to EMS 233 and/or EMS 234. Settings can include, e.g., parameter values for parameter 221 and/or parameter 223. EMS 233 or EMS 237 can manage devices 234, 235, 238, 239 in part, by deploying settings to these devices. Thus, once a parameter such as 221 is configured at devices 234 and 235, management platform 211 can optionally control the parameter value by deploying settings in real-time or near real time as desired to optimize the RAN 230. In some cases, parameter 221 values can also be modified in real-time or near real-time by EMS 233 and/or the devices 234, 235.

Furthermore, RAN devices 234, 235, 238, and 239 can optionally report RAN data 240 to management platform 211. RAN data 240 can be analyzed at management platform 211 to determine whether further parameters can be beneficially deployed to RAN devices 234, 235, 238, and 239. In response to management platform 211 identifying further useful parameters, such parameters can be deployed to RAN 230 in similar fashion to deployment of parameters 221 and 223, and such parameters can optionally be managed by deploying additional parameter settings to RAN 230.

Aspects of this disclosure relate to techniques at management platform 211 to generate and deploy parameters, such as 221 and 223, to EMS such as 233 and 237. Multiple different EMS in a RAN 230 can comprise, e.g., EMS provided by different vendors. As such, different EMS 233, 237 can implement different protocols and requirements. Aspects of this disclosure can improve automation in deployment of parameters 221, 223 to multiple different EMS 233, 237.

In some embodiments, the structures and techniques disclosed herein can be performed in conjunction with, or supplemented by, aspects of previous approaches to parameter deployment, as will be appreciated. For example, in one approach to parameter deployment, a specific parameter can be hard-coded at management platform 211 for use by a specific EMS. The management platform 211 can then send the code implementing the specific parameter to the corresponding EMS.

In another approach to parameter deployment, a model-driven technique can be used. The management platform 211 can apply a defined model as a bridge between management platform 211 and an EMS. The defined model can provide a generic framework to generate code that implements a parameter at an EMS. The defined model includes a description of specific attributes. Once code is generated based on the model, the management platform 211 can then send the code implementing the parameter to the EMS.

In parameter deployment techniques according to this disclosure, a model-free framework can be implemented at management platform 211, in which a technique to describe parameters is defined for management platform 211, rather than defining or exposing specific parameter names. Parameters defined according to the techniques disclosed herein can be modified to meet requirements of any EMS, as will be described further herein.

Figure 3:
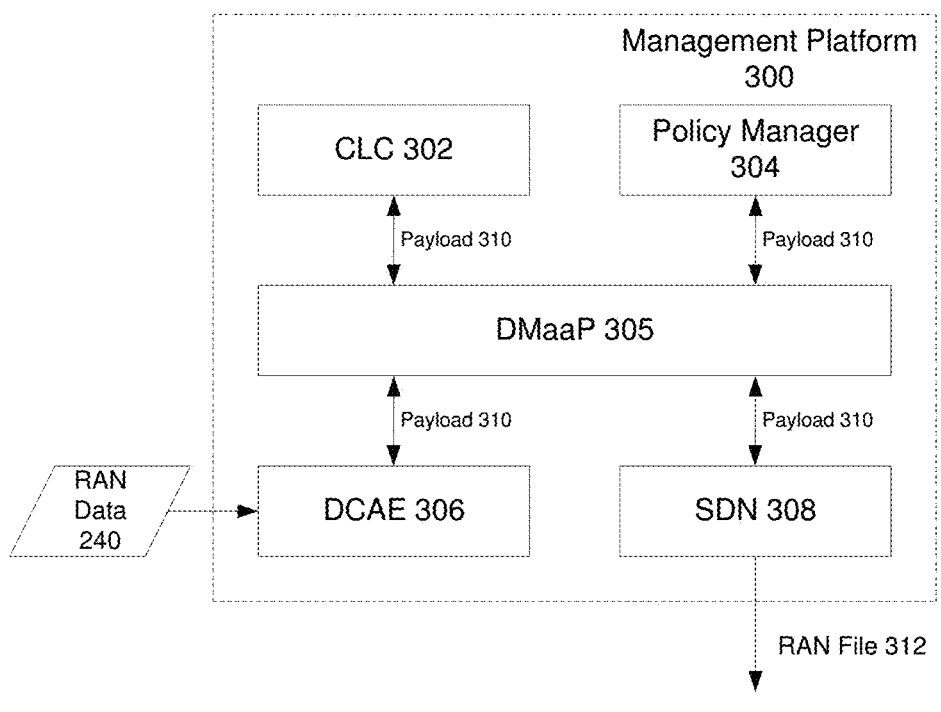
FIG. 3 illustrates components of an example management platform equipped to generate parameters for RAN devices and deploy the parameters to the RAN, in accordance with various aspects and embodiments of the subject disclosure.

FIG. 3 illustrates components of an example management platform equipped to generate parameters for RAN devices and deploy the parameters to the RAN in accordance with various aspects and embodiments of the subject disclosure. In some embodiments, the example management platform 300 illustrated in FIG. 3 can implement, e.g., the management platform 211 illustrated in FIG. 2. Example management platform 300 includes a control loop coordinator (CLC) 302, a policy manager 304, a data movement as a platform (DMaaP) 305, a DCAE 306, and a SDN 308. The CLC 302, policy manager 304, DCAE 306, and SDN 308 are connected to the DMaaP 305, and the various components of the management platform 300 can thereby communicate through DMaaP 305. In some embodiments, the SDN 308 can comprise, e.g., a software defined network-radio (SDN-R) type SDN function or device.

In FIG. 3, RAN data 240, introduced in FIG. 2, can be collected at DCAE 306. DCAE 306 can analyze collected RAN data 240 and suggest/generate parameters for RAN devices, based on the analysis, as described herein. The DCAE 306 can place a parameter in a defined data structure, also referred to herein as a payload 310. The payload 310 can be sent from DCAE 306 to CLC 302 and policy manager 304 via DMaaP 305. CLC 302 and policy manager 304 can evaluate the parameter in payload 310, and approve or disapprove the parameter. If approved, the payload 310 with the parameter can be sent to SDN 308 via DMaaP 305. SDN 308 can use the parameter in the payload 310 to generate a modified data structure, referred to herein as a RAN file 312, which can comprise a file or other data structure having properties which meet syntax and other requirements for a particular EMS, such as EMS 233 or EMS 237 in FIG. 2. SDN 308 can deploy the RAN file 312 to the applicable EMS.

Figure 4:
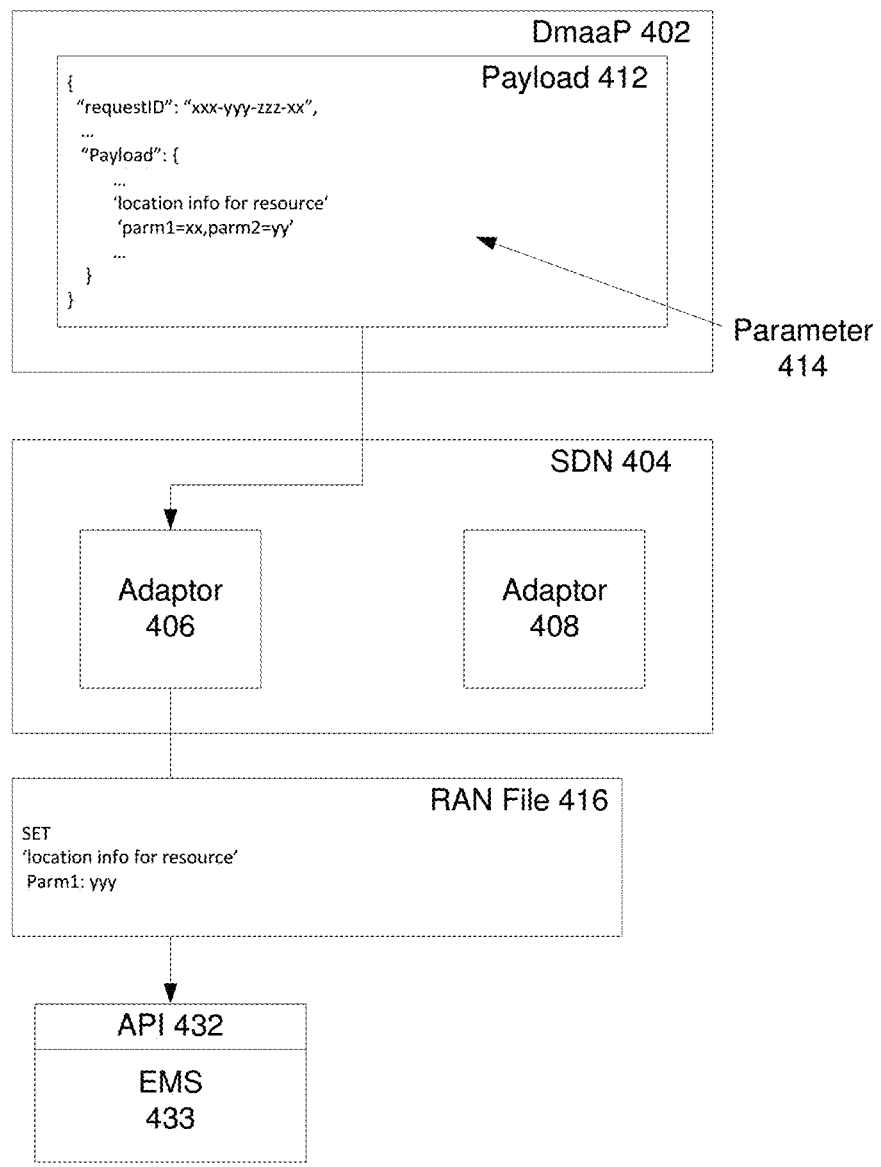
FIG. 4 illustrates a subset of the components illustrated in FIG. 3, and example management platform processing to deploy a parameter from the management platform to a RAN, in accordance with various aspects and embodiments of the subject disclosure.

FIG. 4 illustrates a subset of the components illustrated in FIG. 3, and example management platform processing to deploy a parameter from the management platform to a RAN, in accordance with various aspects and embodiments of the subject disclosure. FIG. 4 includes a DMaaP 402, a SDN 404, and an EMS 433. In some embodiments, the structures and techniques illustrated in FIG. 4 can be incorporated into a management platform 300 such as described in connection with FIG. 3. DMaaP 402 comprises a payload 412 which includes a parameter 414. The payload 412 is provided from DMaaP to SDN 404. SDN 404 comprises multiple adaptors, e.g., an adaptor 406 and an adaptor 408. The payload 412 can be provided, e.g., to adaptor 406, wherein adaptor 406 is the adaptor for EMS 433. Adaptor 406 can generate a RAN file 416 based on the payload 412. RAN file 416 can include an appropriately formatted parameter for EMS 433, wherein the appropriately formatted parameter is based on parameter 414. SDN 404 can deploy the RAN file 416 to the EMS 433 through an interaction with API 432.

Figure 5:
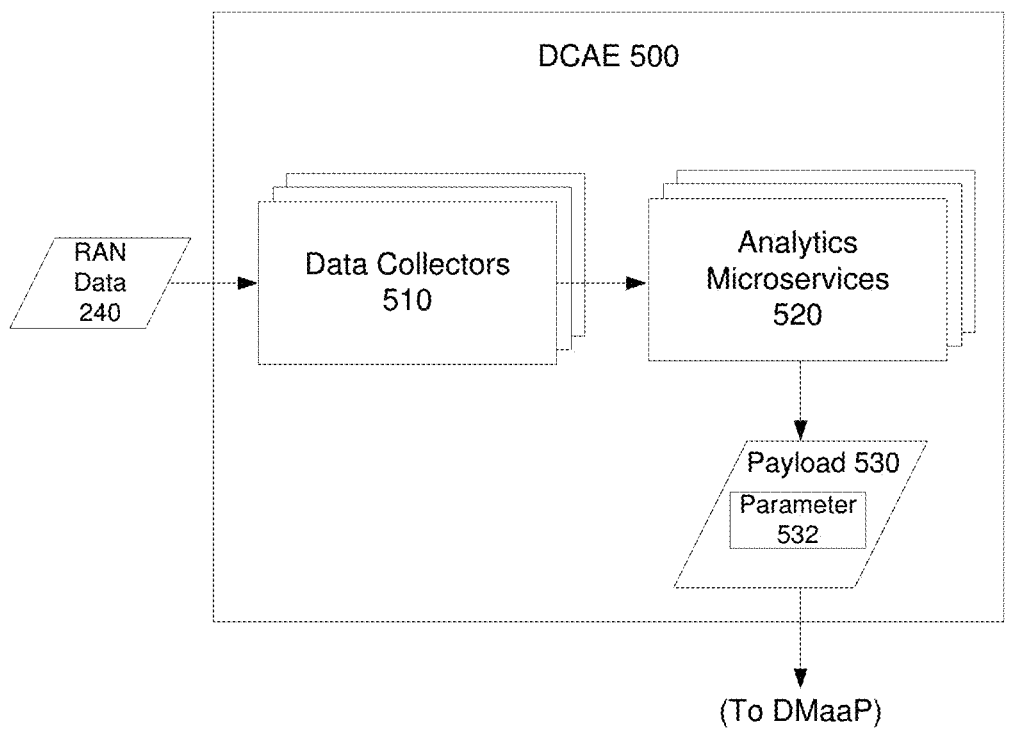
FIG. 5 illustrates an example data collection, analysis and events (DCAE) function of a management platform, in accordance with various aspects and embodiments of the subject disclosure.

FIG. 5 illustrates an example data collection, analysis and events (DCAE) function of a management platform, in accordance with various aspects and embodiments of the subject disclosure. FIG. 5 includes example DCAE 500. DCAE 500 comprises data collectors 510 and analytics microservices 520. In some embodiments, a DCAE such as DCAE 500 can be incorporated into a management platform 300 such as illustrated in FIG. 3.

In FIG. 5, RAN data 240, e.g., data from RAN devices such as illustrated in FIG. 2, can be collected by data collectors 510. Different data collectors can optionally collect and organize different types of RAN data. Analytics and microservices 520 can process data collected by data collectors 510 in order to identify opportunities to improve the function of RAN devices, e.g., by identifying new parameters to optimize processing by RAN devices or communications between RAN devices. Once identified, a new parameter 532 can be placed in a payload 530, wherein payload 530 is a defined data structure according to this disclosure. The payload 530 can be sent to a DMaaP, where payload 530 can subsequently be sent to a CLC, policy manager, and SDN components of a management platform, and the parameter 532 can ultimately be deployed from the SDN, as described in connection with FIG. 3.

Figure 6:
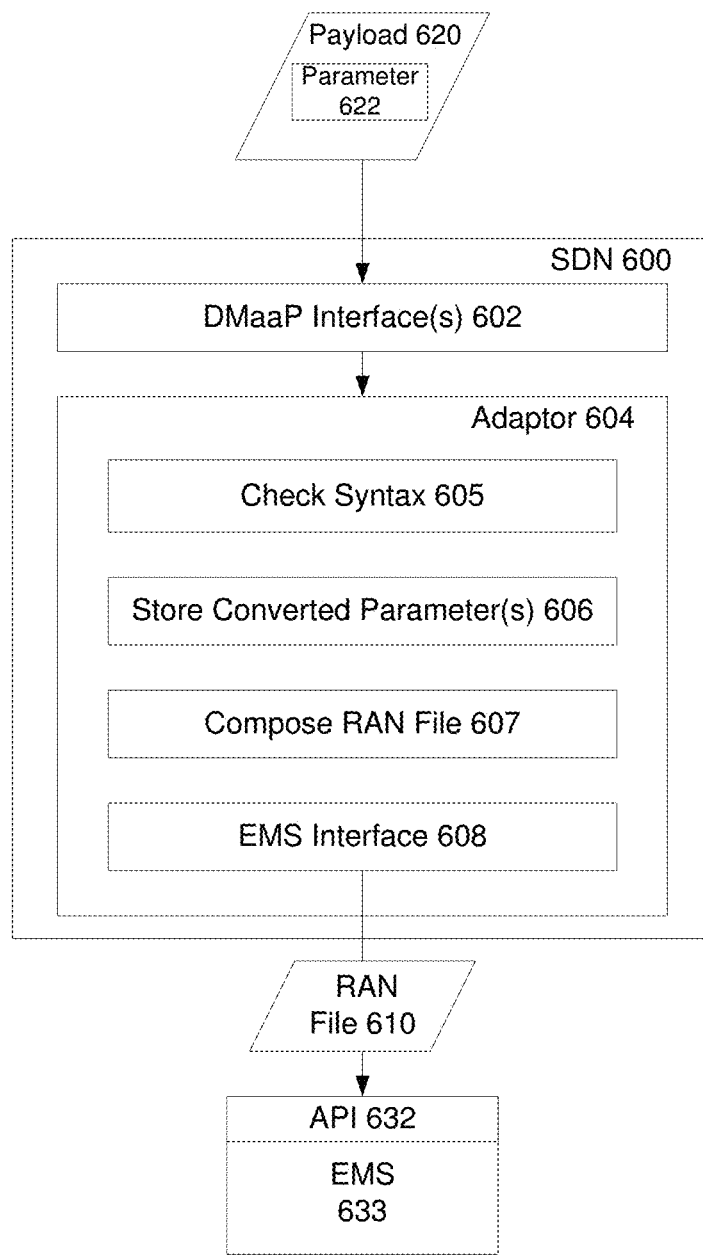
FIG. 6 illustrates an example software defined networking (SDN) function of a management platform, in accordance with various aspects and embodiments of the subject disclosure.

FIG. 6 illustrates an example software defined networking (SDN) function of a management platform, in accordance with various aspects and embodiments of the subject disclosure. In some embodiments, an SDN such as SDN 600 can be incorporated into a management platform 300 such as illustrated in FIG. 3. Example SDN 600 includes DMaaP interface(s) 602 and an example adaptor 604. One example adaptor 604 is illustrated in FIG. 6, however embodiments can include multiple adaptors, e.g., as illustrated in FIG. 4. Adaptor 604 includes check syntax 605, store converted parameter(s) 606, compose RAN file 607, and EMS interface 608.

In FIG. 6, a payload 620 comprising a parameter 622 can be received at DMaaP interface(s) 602. The DMaaP interface(s) 602 can send the payload 620 to an appropriate adaptor, e.g., adaptor 604, to generate a RAN file 610 for a destination EMS 633. The adaptor 604 can generate RAN file 610 based on the payload 620, and adaptor 604 can deploy the RAN file 610 to an API 632 for the destination EMS 633.

FIG. 6 illustrates example components and operations of adaptor 604. The check syntax block 605 can for example convert a syntax of the parameter 622 into a syntax used at EMS 633. In some embodiments, check syntax block 605 can for example string match the parameter 622 with a regular expression, e.g. ^([a-z|A-z]+=[a-z|A-Z|0-9]+,)+[a-z|A-z]+=[a-z|A-Z|0-9]+$. String matching is one possible implementation, however this disclosure is not limited to any particular syntax conversion technique.

The store converted parameter(s) block 606 can store suggested converted parameter values calculated by check syntax block 605 based on parameter 622. For example, a data structure comprising key/value pairs, such as set forth below can be used to store converted parameter values:

Key: aaaa,bbbb
Values: Parm1=yyy
Key: eeee,ffff
Values: Parm1=yyy2

It will be appreciated that there are many options for storing data and this disclosure is not limited to any data storage format or technique.

The compose RAN file block 607 can generate a RAN file, such as RAN file 610, from the converted parameter values stored at block 606. In some embodiments, for a given input, compose RAN file block 607 can compose a dynamic format file output for a particular EMS, such as EMS 633. Below is example data for a RAN file 610, based on a payload such as payload 620 or payload 412, illustrated in FIG. 4, and the converted parameter values suggested above:

SET
'location info for resource'
Parm1=yyy
SET
'location info for resource'
Parm1=yyy2

The EMS interface block 608 can send the composed RAN file 610 to an appropriate EMS 633, for example by passing the RAN file 610 to API 632. In some embodiments, the RAN file 610 can be sent along with a validation option for a semantic check at EMS 633.

Figure 7:
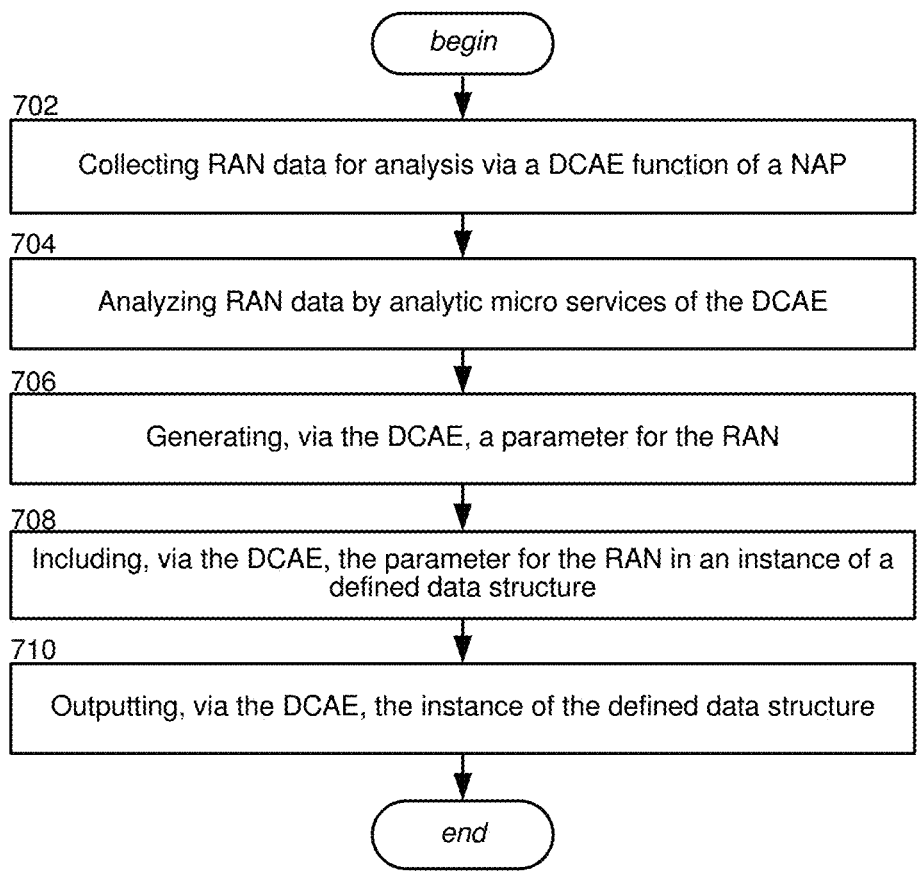
FIG. 7 is a flow diagram representing example DCAE operations to generate a new parameter for deployment to a RAN, in accordance with various aspects and embodiments of the subject disclosure.

FIG. 7 is a flow diagram representing example DCAE operations to generate a new parameter for deployment to a RAN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operations 702 and 704. Block 702 represents collecting RAN data for analysis via a DCAE function of a management platform. Block 704 represents analyzing RAN data by analytic micro services of the DCAE. For example, as illustrated in FIG. 5, at block 702 data collectors 510 of DCAE 500 can collect RAN data 240 for analysis. At block 704, analytics microservices 520 of the DCAE 500 can analyze RAN data 240.

Example operations comprise operation 706, which represents generating, via the DCAE, a parameter for the RAN. For example, as illustrated in FIG. 5, analytics microservices 520 of the DCAE 500 can generate, based on the analysis of RAN data 240 at block 704, a parameter, e.g., parameter 532, for the RAN or a subset of the RAN which supplied the RAN data 240.

Example operations comprise operation 708, which represents including, via the DCAE, the parameter for the RAN in an instance of a defined data structure. For example, as illustrated in FIG. 5, analytics microservices 520 of the DCAE 500 can include the parameter 532 in payload 530, wherein payload 530 is an instance of a defined data structure. A definition of the defined payload 530 data structure can permit different instances of the payload 530 defined data structure to include different parameters for different RANs. Parameters in payloads can optionally be required to conform to any desired parameter definition rules, e.g., for parameter semantics, syntax, structure, or other properties.

Example operations comprise operation 710, which represents outputting, via the DCAE, the instance of the defined data structure. For example, as illustrated in FIG. 5, DCAE 500 can output payload 530 to DMaaP. After output of the payload 530 by DCAE 500, a CLC 302 and policy manager 304 can be used to approve the parameter 532, e.g., as described in connection with FIG. 3. The payload 530 can then be sent via a DMaaP interface, e.g., DMaaP interface(s) 602, illustrated in FIG. 6, to an SDN device such as SDN 600. SDN 600 can receive the payload 530, format the payload 530 for the RAN, and deliver a corresponding formatted data structure, namely, RAN file 610 to the EMS 633 for the RAN. SDN 600 can format the payload 530 for the RAN by modifying the parameter, e.g., parameter 532 or 622, to conform to a syntax used by the RAN EMS.

Figure 8:
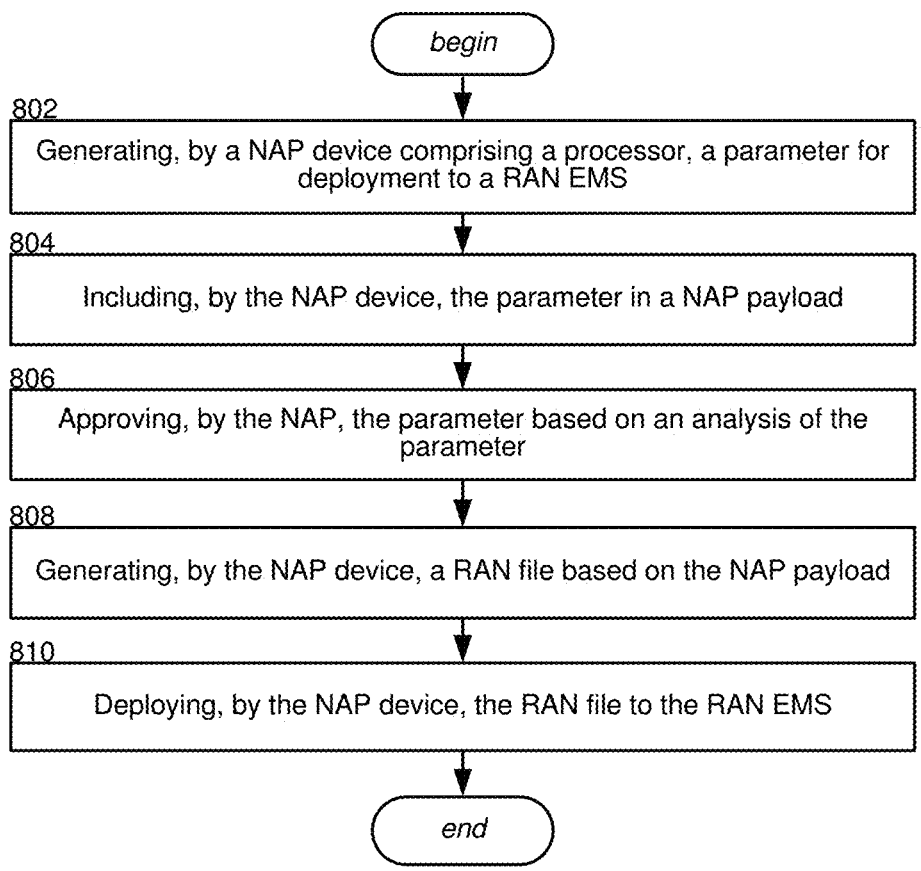
FIG. 8 is a flow diagram representing example management platform operations to generate and deploy a new parameter to a RAN, in accordance with various aspects and embodiments of the subject disclosure.

FIG. 8 is a flow diagram representing example management platform operations to generate and deploy a new parameter to a RAN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 802, which represents generating, by a management platform device comprising a processor, a parameter for deployment to a RAN EMS. For example, as illustrated in FIG. 3, a device of management platform 300 that hosts the DCAE 306 can collect and analyze RAN data 240 in order to generate a parameter for deployment to a RAN EMS. Example operations furthermore comprise operation 804, which represents including, by the management platform device, the parameter in a management platform payload. For example, as illustrated in FIG. 3, the device of management platform 300 that hosts the DCAE 306 can include the generated parameter in a management platform payload 310.

Example operations comprise operation 806, which represents approving, by the management platform, the parameter based on an analysis of the parameter. For example, as illustrated in FIG. 3, DMaaP 305 can deliver the payload 310 to CLC 302 and/or policy manager 304. CLC 302 and/or policy manager 304 can analyze the parameter included in payload 310, e.g., by comparing the parameter to other management platform 300 parameters to prevent parameter redundancy, or by checking whether the parameter complies with management platform policies. CLC 302 and/or policy manager 304 can approve or disapprove the parameter based on the analysis of the parameter. If approved, the parameter and payload 310 can pass to SDN 308 for deployment.

Example operations comprise operation 808, which represents generating, by the management platform device, a RAN file based on the management platform payload. For example, as illustrated in FIG. 3, a device of management platform 300 hosting SDN 308 can generate RAN file 312 based on the management platform payload 310. The RAN file 312 can comprise, e.g., any file properties associated with the RAN EMS to which the RAN file 312 is to be delivered. For example, the RAN file 312 properties can include syntax properties to comply with requirements of the RAN EMS. Generating the RAN file 312 based on the payload 310 can comprise, e.g., converting the parameter into the EMS syntax.

Example operations comprise operation 810, which represents deploying, by the management platform device, the RAN file to the RAN EMS. For example, as illustrated in FIG. 3, a device of management platform 300 hosting SDN 308 can deploy RAN file 312 to the RAN EMS, such as EMS 233 illustrated in FIG. 2, or EMS 633 illustrated in FIG. 6. In an embodiment, the RAN file 312 can be deployed to the EMS 233 via an EMS API 232, illustrated in FIG. 2. In scenarios wherein multiple different RAN files are generated for multiple different RAN EMS, such as EMS 233 and EMS 237, illustrated in FIG. 2, the SDN 308 can use different respective adaptors, such as adaptor 406 and adaptor 408, illustrated in FIG. 4, to generate the RAN files for the different respective EMS 233, 237.

Figure 9:
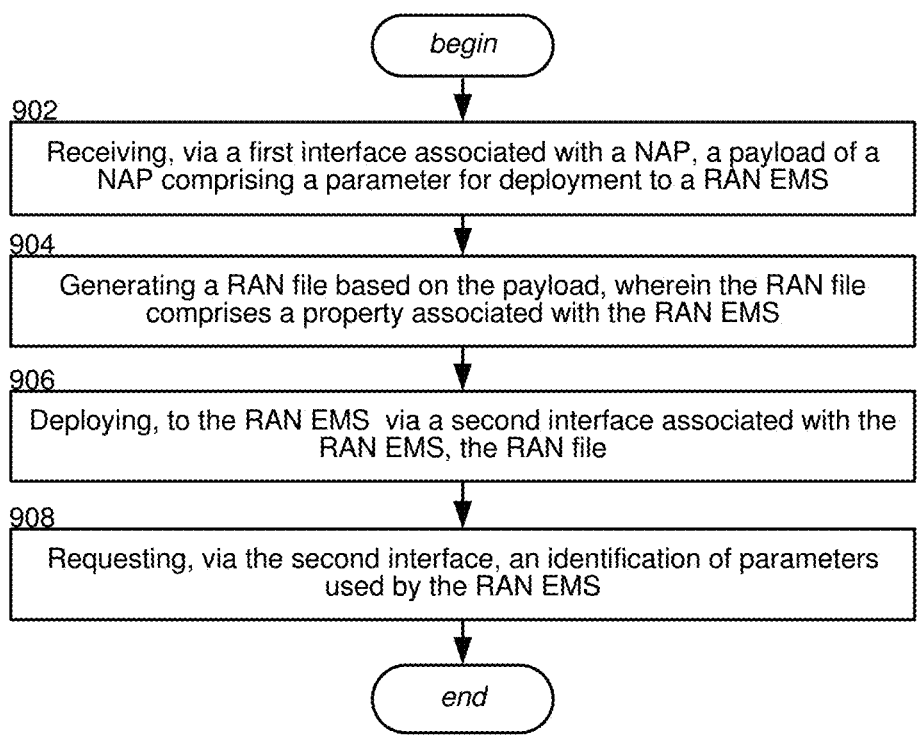
FIG. 9 is a flow diagram representing example SDN operations to process and deploy a new parameter to a RAN, in accordance with various aspects and embodiments of the subject disclosure.

FIG. 9 is a flow diagram representing example SDN operations to process and deploy a new parameter to a RAN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 902, which represents receiving, via a first interface associated with a management platform, a payload of the management platform comprising a parameter for deployment to a RAN EMS. For example, as illustrated in FIG. 6, SDN 600 can receive, via a first interface of DMaaP interface(s) 602, a payload 620 of a management platform, such as management platform 300 illustrated in FIG. 3, wherein payload 620 comprises a parameter 622 for deployment to a RAN EMS 633. The payload 620 can comprise a data type which is defined within a management platform comprising the SDN 600 to designate management platform parameters for deployment to RAN EMS. The data type for payload 620 can be generic to multiple potential RAN EMS.

Example operations comprise operation 904, which represents generating a RAN file based on the payload, wherein the RAN file comprises a property associated with the RAN EMS. For example, as illustrated in FIG. 6, SDN 600 can generate RAN file 610 based on payload 620. RAN file 610 can be configured to include properties needed by, or associated with, the RAN EMS 633.

In some embodiments, the property of the RAN file 610 associated with the RAN EMS can comprise a syntax used by the RAN EMS, and generating the RAN file 610 based on the payload 620 can comprise converting the parameter 622 into the syntax, e.g., by the check syntax function 605 of the adaptor 604.

Example operations comprise operation 906, which represents deploying, to the RAN EMS via a second interface associated with the RAN EMS, the RAN file. For example, as illustrated in FIG. 6, SDN 600 can deploy the RAN file 610 to the RAN EMS 633 via a second interface, such as the API 632 associated with the RAN EMS 633. An embodiment such as illustrated in FIG. 4 can be used to deploy multiple different RAN files to multiple different RAN EMS. The different RAN files can be generated by the different adaptors 406, 408, and the different RAN files can be deployed via multiple different interfaces, e.g., the APIs 232, 236 illustrated in FIG. 2.

Example operations comprise operation 908, which represents requesting, via the second interface, an identification of parameters used by the RAN EMS. Operation 908 is an optional operation to gather current parameter information from an EMS. For example, as illustrated in FIG. 6, SDN 600 can request, via the API 632, an identification of parameters used by the RAN EMS 633. EMS 633 can return to SDN 600 a list of parameters that are currently in use by various RAN elements managed by the EMS 633. The SDN 600 can send the list of parameters, via a DMaaP 305 to other management platform 300 functions.

Figure 10:
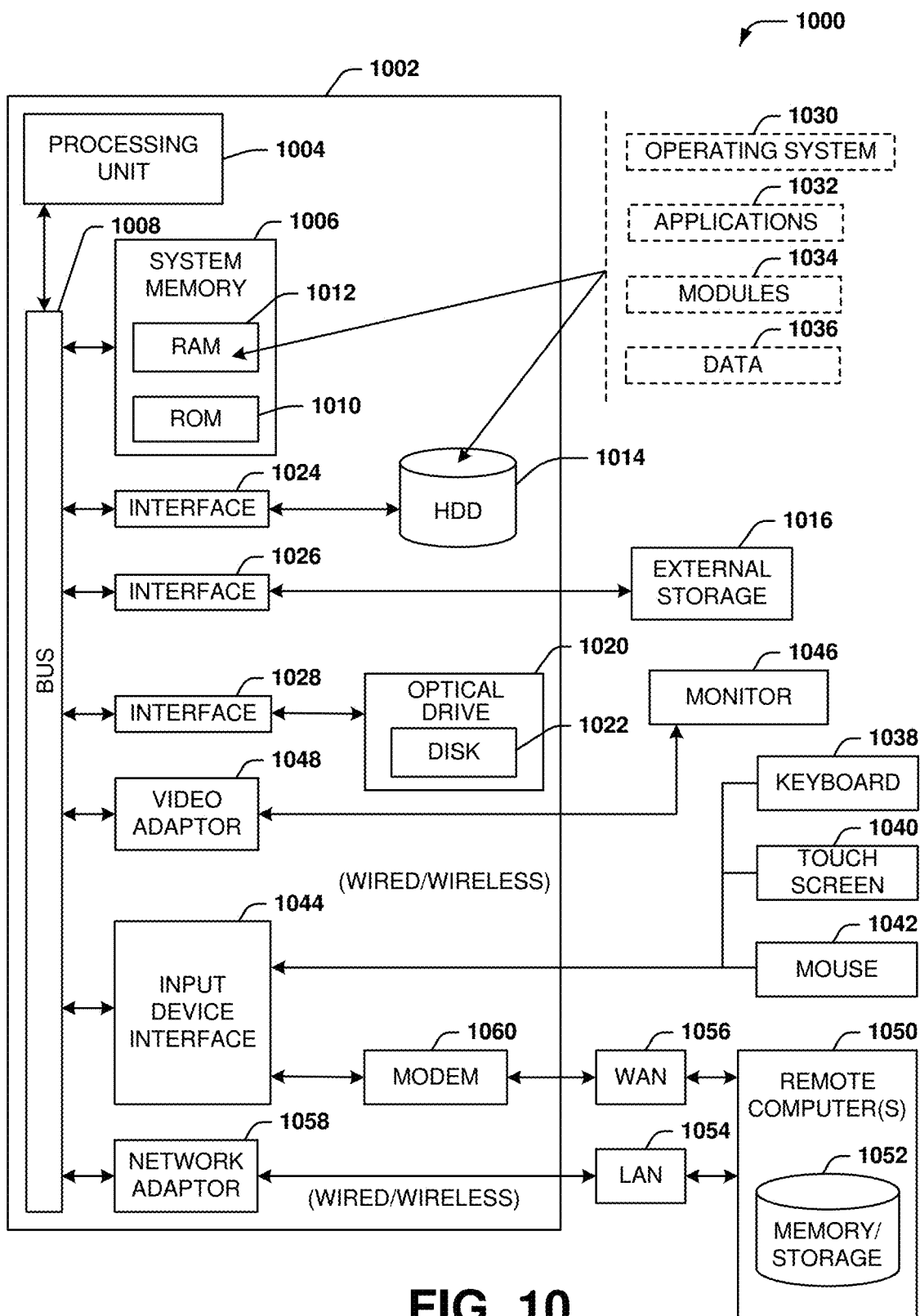
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a management platform computing device, a RAN device, or an EMS device, as described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method for a network management platform comprising a data collection component, a control loop coordinator, a policy manager, a data movement component, and a software defined networking component, the method comprising:

generating, by the network management platform, a parameter comprising an adjustable interface element for radio access network nodes, wherein the parameter is deployable to the radio access network nodes via multiple radio access network element management systems, wherein the parameter comprises a data type that is designated for parameters deployable to the multiple radio access network element management systems;

including, by the network management platform, the parameter in a management platform payload;

providing, by the network management platform, the management platform payload to multiple adaptors corresponding to respective radio access network element management systems of the multiple radio access network element management systems;

generating, by the multiple adaptors, respective radio access network files based on the management platform payload, wherein the respective radio access network files comprise the parameter and respective radio access network file properties associated with the respective radio access network element management systems; and deploying, by the network management platform, the respective radio access network files to the respective radio access network element management systems, wherein the respective radio access network element management systems are adapted to provide the parameter from the respective radio access network files to respective radio access network nodes of the radio access network nodes, thereby enabling control, by the network management platform, of the parameter at the respective radio access network nodes.

2. The method of claim 1, wherein the data collection component generates the parameter based on an analysis of radio access network data.

3. The method of claim 1, further comprising approving, by the network management platform, the parameter based on an analysis of the parameter by at least one of the control loop coordinator or the policy manager.

4. The method of claim 1, wherein the multiple adaptors are components of the software defined networking component.

5. The method of claim 1, wherein the respective radio access network file properties associated with the respective radio access network element management systems utilize different respective syntaxes.

6. The method of claim 1, wherein the software defined networking component deploys the respective radio access network files to the respective radio access network element management systems.

7. The method of claim 6, wherein the respective radio access network element management systems comprise respective element management system interfaces for communication with the software defined networking component.

8. A management platform comprising a data collection component, a control loop coordinator, a policy manager, a data movement component, and a software defined networking component, the management platform comprising:

a processor; and a memory that stores executable instructions that, when executed by the processor, facilitate performance of operations, comprising:

generating a parameter for deployment to radio access networks, wherein the parameter comprises an adjustable interface element for radio access network nodes, and wherein the parameter comprises a data type that is designated as deployable to multiple radio access networks comprising the radio access network nodes;

sending the parameter in a management platform payload to multiple adaptors corresponding to respective radio access networks of the radio access networks;

obtaining, from the multiple adaptors, respective radio access network files generated based on the management platform payload, comprising the parameter and respective radio access network file properties associated with the respective radio access networks; and deploying, to respective element management systems for the respective radio access networks, the respective radio access network files to the respective radio access networks, wherein the respective radio access network element management systems are adapted to provide the parameter from the respective radio access network files to respective radio access network nodes of the radio access network nodes, thereby enabling management platform control of the parameter at the respective radio access network nodes.

9. The management platform of claim 8, wherein the data collection component generates the parameter based on an analysis of radio access network data applicable to the radio access networks.

10. The management platform of claim 8, wherein the operations further comprise approving the parameter based on an analysis of the parameter.

11. The management platform of claim 8, wherein obtaining the respective radio access network files generated based on the management platform payload comprises providing the management platform payload to the software defined networking component, wherein the software defined networking component comprises the multiple adaptors.

12. The management platform of claim 8, wherein the radio access network file properties associated with the respective radio access networks comprise respective syntaxes used by the respective element management systems, and wherein obtaining the respective radio access network files generated based on the management platform payload comprises converting the parameter into the respective syntaxes.

13. The management platform of claim 8, wherein the deploying comprises deploying the respective radio access network files to the respective radio access networks using the software defined networking component.

14. The management platform of claim 13, wherein the software defined networking component comprises respective element management system interfaces for communication to the respective element management systems.

15. A non-transitory machine-readable medium, comprising executable instructions that, when executed by a processor of management platform equipment, facilitate performance of operations, comprising:

generating a parameter for deployment to element management systems associated with radio access networks, wherein the parameter comprises an adjustable interface element for radio access network nodes, and wherein the parameter comprises a data type that indicates the parameter is deployable to the radio access network nodes via multiple element management systems;

including the parameter in a management platform payload provided to multiple adaptors corresponding to respective element management systems of the multiple element management systems; and deploying respective radio access network files to the respective element management systems, wherein the respective radio access network files comprise the parameter and respective radio access network file properties and were generated by respective ones of the multiple adaptors based on the management platform payload, wherein the respective element management systems are adapted to provide the parameter from the respective radio access network files to respective radio access network nodes of the radio access network nodes, thereby enabling the management platform equipment to control the parameter at the respective radio access network nodes.

16. The non-transitory machine-readable medium of claim 15, wherein a data collection component of the management platform equipment generates the parameter based on an analysis of radio access network data.

17. The non-transitory machine-readable medium of claim 15, wherein the operations further comprise approving the parameter based on an analysis of the parameter by at least one of a control loop coordinator or a policy manager of the management platform equipment.

18. The non-transitory machine-readable medium of claim 15, wherein a software defined networking component of the management platform equipment comprises the multiple adaptors.

19. The non-transitory machine-readable medium of claim 15, wherein the respective radio access network file properties comprise respective syntaxes used by respective element management systems of the element management systems, and wherein generation of the respective radio access network files by the multiple adaptors based on the management platform payload comprises conversion of the parameter into the respective syntaxes.

20. The non-transitory machine-readable medium of claim 15, wherein the deploying comprises using a software defined networking component of the management platform equipment.

\* \* \* \* \*